Aug. 2, 1955   W. C. STEELE   2,714,281
PRUNE AND NUT HARVESTER
Filed Nov. 10, 1952   8 Sheets-Sheet 1

William C. Steele
INVENTOR.

Aug. 2, 1955

W. C. STEELE

2,714,281

PRUNE AND NUT HARVESTER

Filed Nov. 10, 1952

William C. Steele
INVENTOR.

Aug. 2, 1955 W. C. STEELE 2,714,281
PRUNE AND NUT HARVESTER
Filed Nov. 10, 1952 8 Sheets-Sheet 5

William C. Steele
INVENTOR.

Aug. 2, 1955

W. C. STEELE 2,714,281

PRUNE AND NUT HARVESTER

Filed Nov. 10, 1952

William C. Steele
INVENTOR.

United States Patent Office 2,714,281
Patented Aug. 2, 1955

2,714,281

PRUNE AND NUT HARVESTER

William C. Steele, San Jose, Calif.

Application November 10, 1952, Serial No. 319,734

14 Claims. (Cl. 56—329)

This invention relates in general to harvesting equipment, and more specifically to a prune and nut harvester.

At the present time, there are many fruit and nut grove owners, specially in the far west, who have large groves of fruit and nuts which ripen substantially all at the same time and which must be immediately harvested. In the past, the harvesting of fruit and nut crops was a relatively simple operation accomplished by hiring itinerant laborers who migrated from one area to another harvesting the crops as they matured. However, in the recent years, the supply of migrating workers has become greatly diminished and those workers that are available cannot be depended upon. Because of this fact, many fruit and nut grove owners are finding themselves in the predicament where their crops are ready to be harvested and there is no one to harvest them, with the result that the crops rot on the trees. It is, therefore, desirable to provide an improved fruit and nut harvester which is highly mobile and which will accomplish the results of many workmen in a harvesting operation.

The primary object of this invention is to provide an improved mechanical harvester for fruit and nuts which will effectively harvest certain fruit and nut crops in a relatively short period of time without damaging the fruits and nuts in excess of that normally found in manual harvesting.

Another object of this invention is to provide an improved prune and nut picker which is highly mobile and which may be moved about a prune or nut grove for continuous harvesting of the crops of trees in the groves.

Another object of this invention is to provide an improved prune and nut harvester which is highly maneuverable and which is entirely mechanical whereby nut and fruit crops may be harvested in a simple and quick mechanical operation with a maximum amount of the crop being removed from the trees.

Another object of this invention is to provide an improved mechanical fruit and nut harvester which is of relatively simple construction and which may be formed of readily obtainable materials so as to be economically feasible.

Another object of this invention is to provide an improved fruit and nut harvester which is especially adapted for removing crops from trees in a mechanical operation, the cost of operation of the fruit and nut harvester being much less than that of hand harvesting of the crops.

A further object of this invention is to provide an improved fruit and nut harvester which includes a mobile platform having mounted thereon and projecting therefrom a conveyor, said conveyor having associated therewith a hopper adapted to surround a tree for receiving fruit or nuts falling therefrom, said hopper being designed to deliver the fruit and nuts to said conveyor for subsequent movement to a receiving station.

Another object of this invention is to provide an improved hopper for surrounding the base of a fruit or nut tree for receiving fruit or nuts falling therefrom, said hopper being generally circular in outline and being foldable to a relatively compact state for movement, said hopper having means for mechanically moving the same into a position surrounding the base of a tree.

A still further object of this invention is to provide an improved tree shaking device, said tree shaking device being adapted to engage limbs of a fruit or nut tree for shaking the fruit or nuts therefrom, said tree shaking device including an extensible pole having associated therewith vibrating means for vibrating an associated three limb, said pole being provided with counterbalance means to facilitate the movement thereof by an operator of the same.

These together with other objects and advantages which will beome subsequently apparent reside in the details of construction and operation as more fully hereinafter described and claimed, reference being had to the accompanying drawings forming a part hereof, wherein like numerals refer to like parts throughout, and in which:

Referring now to the drawings in detail, it is seen that the fruit and nut harvester, which is the subject of this invention, includes a mobile base which is in the form of a vehicle referred to in general by the reference numeral 10. The vehicle 10 may be of any conventional design, but is preferably one having a body 12 which includes a flat horizontal support 14 secured to the upper front portion thereof by a plurality of vertical support members in any suitable manner. It is intended that the fruit and nut harvester have the major elements thereof mounted on the platform 14 for movement into the desired positions for the harvesting of fruit and nuts.

The fruit and nut harvester also includes an outwardly projecting cantilevered conveyor which is referred to in general by the reference numeral 18, the conveyor having mounted on the outer end thereof a hopper which is referred to in general by the reference numeral 20. Associated with the hopper 20 and adapted to engage limbs of a tree is a tree shaking device which is referred to in general by the reference numeral 22. The conveyor 18 is pivotally mounted on a first turntable construction which is carried by the platform 14 and referred to by the reference numeral 24. The tree shaking device 22 is carried by a second turntable which is referred to by reference numeral 26 and is carried by the first turntable 24.

Figures 4, 5, 6, 20, 21, 26:
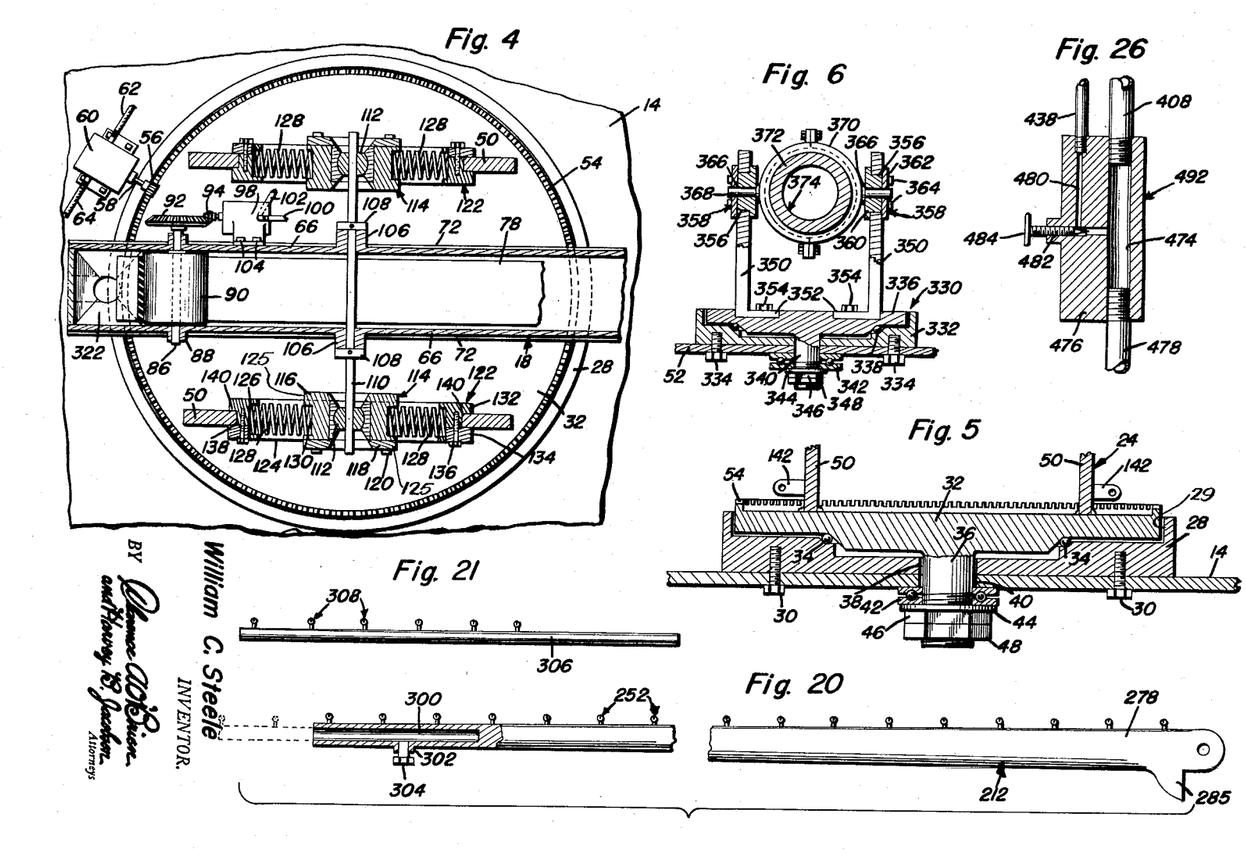
Figure 4 is an enlarged fragmentary sectional view taken substantially upon the plane indicated by the section line 4—4 of Figure 1 and shows the construction of an inner end portion of a conveyor of the fruit and nut harvester and the manner in which the same is mounted on a turntable, also shown is the specific means for selectively rotating the turntable.
Figure 5 is an enlarged fragmentary sectional view taken substantially upon the plane indicated by the section line 5—5 of Figure 1 and shows the manner in which the turntable is rotatably carried by a supporting platform.
Figure 6 is an enlarged fragmentary vertical sectional view taken substantially upon the plane indicated by the section line 6—6 of Figure 2, and shows the specific manner in which a tree shaking device is mounted for pivotal movement about both a vertical and a horizontal axis.
Figure 20 is an enlarged fragmentary side elevational view of one of the support arms and shows the general appearance of the same, an end portion of the support arm being broken away and shown in section in order to clearly illustrate the manner in which an extension may be removably secured therein, the extension being shown in dotted lines.
Figure 21 is a side elevational view of an extension for the support arm of Figure 20.
Figure 26 is an enlarged elevational view with parts in section showing a needle valve for selectively controlling the operation of a counterbalance weight for the tree shaking device.

Referring now to Figure 5 in particular, it is seen that there is illustrated the lower portion of the first turntable 24. The first turntable 24 includes a generally circular seat 28 which rests upon the platform 14 and is secured thereto by a plurality of fasteners 30. The seat 28 has a recessed central portion 29 in which is seated for rotary movement a circular outlying base 32, the base 32 being rotatably supported within the recessed central portion of the seat 28 by a plurality of bearings 34.

The base 32 also includes a centrally located downwardly directed shaft 36 which passes through aligned openings 38 and 40 in the seat 28 and platform 14, respectively. Mounted on the shaft 36 and engaging the undersurface of the platform 14 is a thrust bearing 42 which is retained on the shaft 36 by a collar 44 which engages the underside of the thrust bearing. The collar 44 is retained in position by a nut 46 and a locknut 48.

Extending upwardly from the base 32 in spaced parallel relation are a pair of support plates 50. The support plates 50 are rigidly welded to the upper face of the base 32 and have their upper ends connected by a transversely extending horizontal plate 52. The support plates 50 form the supports for the conveyor 18 so that the conveyor 18 may be rotated about the axes of the shaft 36 upon rotation of the base 32. In order that the base 32 may be selectively rotated to rotate the conveyor 18, the same has projecting upwardly from the upper face thereof a gear ring 54. The gear ring 54 is engaged by a drive pinion 56 mounted on a drive shaft 58 of a fluid motor 60. The fluid motor 60 has connected thereto fluid lines 62 and 64 through which flow of fluid under pressure is selectively controlled in order to determine the direction of rotation of the fluid motor 60.

Figures 7, 8, 9, 11, 12:
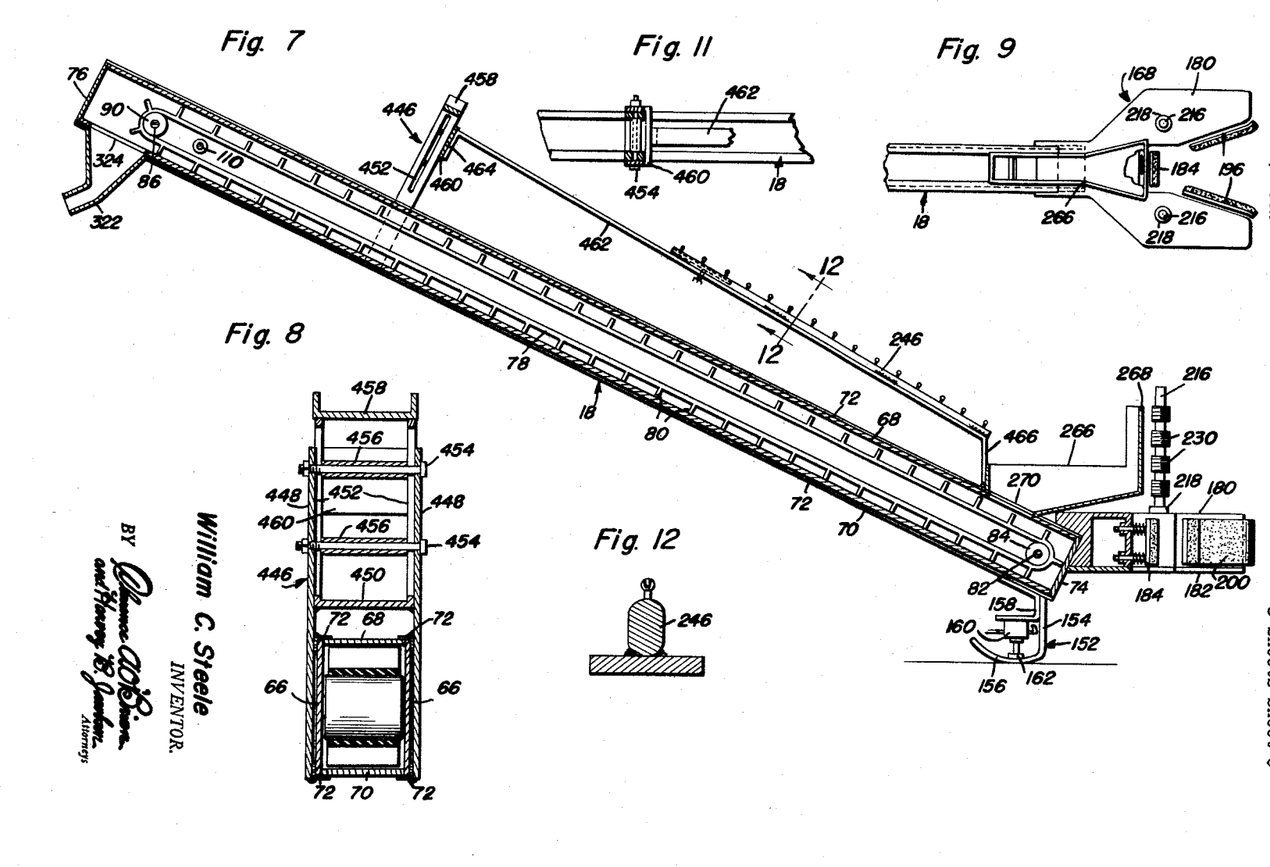
Figure 7 is an enlarged horizontal elevational view of the conveyor of Figure 1 with portions broken away and in section, and showing the general construction thereof including support means for the hopper at its forward end, the support means for the conveyor having been omitted.
Figure 8 is an enlarged transverse vertical sectional view taken substantially upon the plane indicated by the section line 8—8 of Figure 2 and shows the general cross-section of the conveyor and means for adjustably supporting the tree shaking device thereon.
Figure 9 is an enlarged fragmentary top plan view with parts broken away and in section of the forward end of the conveyor and shows the general arrangement of tree engaging means carried thereby, the hopper generally associated with the forward end of the conveyor being omitted.
Figure 11 is an enlarged fragmentary sectional view taken substantially upon the plane indicated by the section line 11—11 of Figure 2 and shows the manner in which one end of a hopper brace is secured to a tree shaking device support carried by the conveyor.
Figure 12 is an enlarged fragmentary transverse vertical sectional view taken substantially upon the plane indicated by the section line 12—12 of Figure 7 and shows the general construction of a portion of the hopper brace including the configuration of a support arm thereof and the means for attaching flexible sections to the support arms.

Referring now to Figures 7 and 8 in particular, it is seen that the conveyor 18 is generally box-shaped in cross-section and is formed by a pair of longitudinally extending spaced parallel side plates 66 which are connected together by upper and lower plates 68 and 70, respectively. The connections between the plates 66, 68 and 70 are re-enforced by outer angle members 72 disposed at the intersections of these plates and overlying the same. The plates 66, 68 and 70 are also joined together at the outer and inner ends by transverse plates 74 and 76, respectively, which form the ends of the conveyor.

The conveyor 18 also includes a conveyor belt 78 which is mounted within the interior of the same, the conveyor belt 78 being provided with a plurality of transverse cleats 80 which are regularly spaced along the length of the same. Mounted adjacent the plate 74 at the outer end of the conveyor 18 is an idler shaft 82 on which is mounted an idler drum 84 about which the conveyor belt 78 rotates. The conveyor 18 also includes a drive shaft 86 which extends transversely between the plates 66 adjacent the plate 76 and rotatably mounted in bosses 88 projecting outwardly from the plate 66. The drive shaft 86 has mounted thereon for rotation therewith a drive drum 90 about which the conveyor belt 78 is entrained and which imparts rotary movement to the same.

As is best illustrated in Figure 4, the drive shaft 86 extends outwardly of one of the plates 66 and has mounted on the outer end thereof of a gear 92. The gear 92 is meshed with a pinion 94 which is carried by a drive shaft 96 of the fluid motor 98. The fluid motor 98 is provided with inlet and outlet fluid lines 100 and 102, respectively, in order that the conveyor belt 78 may be selectively driven. It will be noted that the fluid motor 98 is rigidly attached to an associated plate 66 on the outer surface thereof by a plurality of suitable fasteners 104.

Referring to Figure 4 in particular once again, it will be seen that the plates 66 are provided with a pair of aligned enlarged bosses 106 projecting outwardly from the outer faces thereof forwardly of the bosses 88. Passing through bores in the bosses 106 and positioned therein by collars 108 disposed thereon is a transverse supporting shaft 110. The shaft 110 projects outwardly of the collars 108 and has end portions thereof rotatably mounted in self-aligning bearings 112 disposed on opposite sides of the conveyor 18. The self-aligning bearings are in turn removably secured in two-pieced housings which are referred to in general by the reference numeral 114. Each housing 114 includes a relatively large housing member 116 and a removable plate 118, the plate 118 being secured to the housing member 116 by suitable fasteners 120. It is the plate 118 which retains the self-aligning bearing in the housing member 116.

Figure 2:
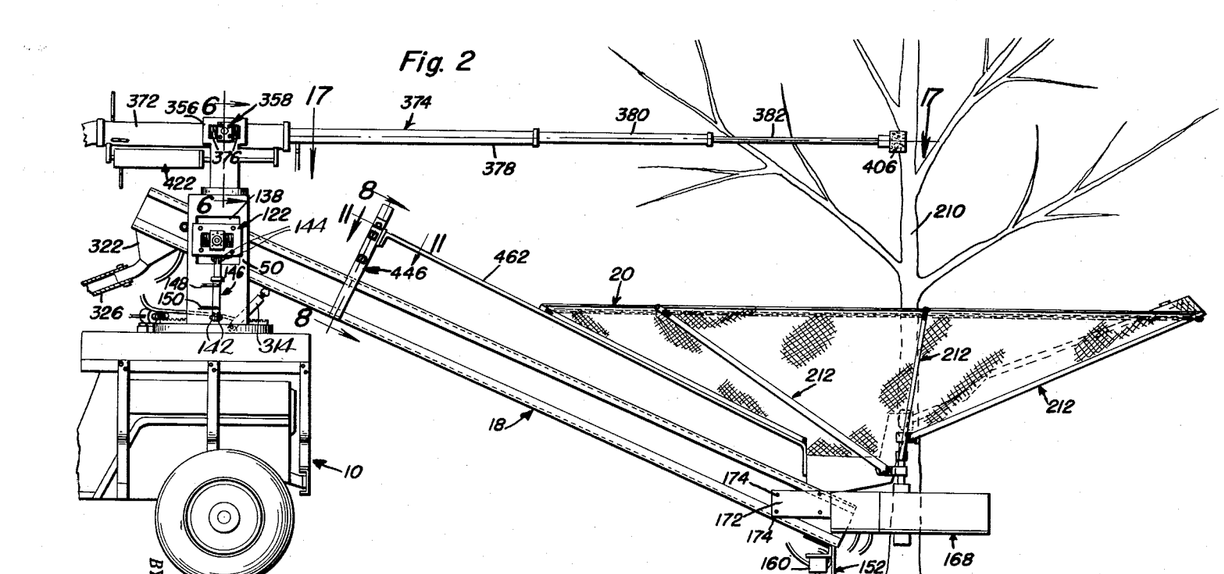
Figure 2 is a fragmentary side elevational view of the fruit and nut harvester of Figure 1 and shows the same being associated with a fruit or nut tree, a rear portion of the fruit and nut harvester being omitted.

As is best illustrated in Figures 2 and 4 in particular, the housing 114 is in turn mounted in a housing which is referred to in general by the reference numeral 122. The housing 122 is of a much greater size than the housing 114 and has a horizontal slot 124 therein. The housing 114 is disposed in the slot 124 for selective horizontal movement and is retained therein for sliding movement by vertically disposed flanges 125 on the housing member 116 and extensions on the plate 118.

It will be noted that the housing 122 is provided at each end of the slot 124 with a recess 126 in which is disposed one end of a coil spring 128. The other end of each coil spring 128 is seated in a recess 130 formed in opposite ends of the housing member 116. It is intended that the springs 128 form a shock absorbing mounting for the conveyor 18 so as to permit horizontal movement of the same with respect to its support means in order to avoid damaging of the same in the positioning thereof in a manner to be described in more detail hereinafter.

The housing 122 is also formed in two pieces and includes a housing member 132 and a removable plate 134, the plate 134 being secured to the housing member 132 by suitable fasteners 136. The housing 122 is mounted within one of the support plates 50 in a vertically extending recess 138 therein for vertical movement. The housing 122 is guidingly received within the recess 138 and retained therein by the projection of portions of its associated support plate 50 into vertical recesses 140 in opposite vertical edges of the housing member 132.

Secured to the bottom portion of each support plate 50 and projecting outwardly therefrom is an ear 142. Each ear 142 is in alignment with a similar ear 144 carried by the lower portion of an associated housing 122. Extending between each pair of ears 142 and 144 is an extensible hydraulic cylinder which is referred to in general by the reference numeral 146, ends of the hydraulic cylinder being pivotally connected to the ears 142 and 144. The hydraulic cylinder 146 has connected thereto fluid lines 148 and 150 for facilitating the adjustment of its length. Inasmuch as there is a hydraulic cylinder 146 disposed on each side of the conveyor 18, it will be seen that the conveyor 18 may be twisted with respect to the vertical axis of the turntable 24 so that the conveyor 18 may remain level even though the vehicle 10 is disposed on uneven ground.

Figures 14, 15, 16, 24, 25:
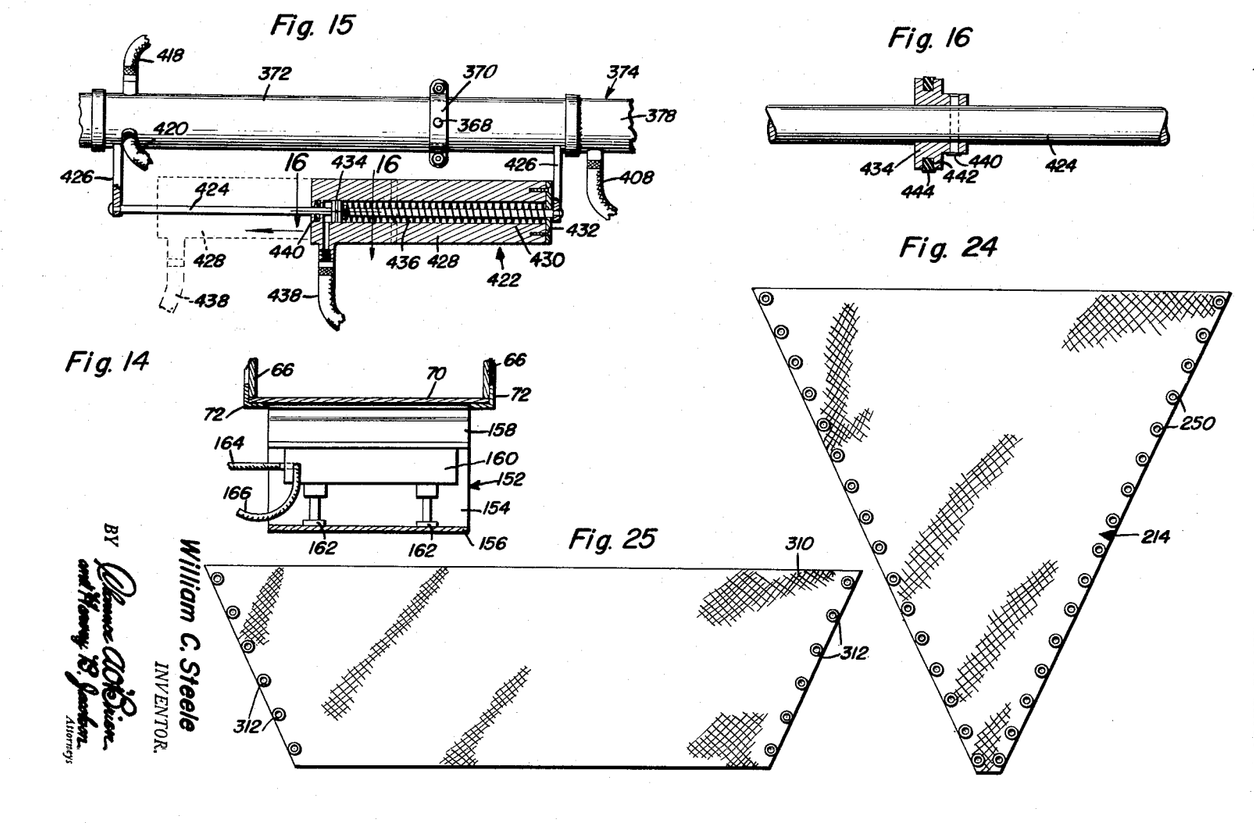
Figure 14 is an enlarged fragmentary vertical sectional view taken substantially upon the plane indicated by the section line 14—14 of Figure 1 and shows the construction of vibrating means at the outer end of the conveyor.
Figure 15 is an enlarged elevational view of the pole and counterbalancing means with parts broken away and shown in section.
Figure 16 is an enlarged fragmentary sectional view taken substantially upon the plane indicated by the section line 16—16 of Figure 15 and shows the manner in which a piston is rigidly attached to a shaft rigidly carried by the tree shaking device.
Figure 24 is an enlarged top plan view of one of the flexible panels of the hopper and shows the general outline of the same.
Figure 25 is a top plan view of an extension flexible panel adapted to be secured at the outer end of the panel of Figure 24 in overlapping relation thereto.

Referring now to Figures 7 and 14 in particular, it is seen that mounted at the outer end of the conveyor 18 and secured to the lower plate 70 is a generally L-shaped ground engaging support which is referred to in general by the reference numeral 152. The support 152 includes a vertical flange 154 and an arcuate generally horizontal flange 156. Also secured to the lower plate 70 is an upper flange of a generally C-shaped mounting bracket 158. The mounting bracket 158 has secured to the lower surface of a lower flange thereof a vibrator 160. The vibrator includes a vibrating head 162 which is secured to the arcuate flange 156 for flexing the same. In fact, there are two such heads 162 which engage the flange 156 at transversely spaced intervals. The vibrator unit 160 has connected thereto fluid lines 164 and 166. It will be understood that the ground engaging support is intended to normally support the outer end of the conveyor 18 during a harvesting operation. The purpose of the vibrator unit 160 will be explained in more detail hereinafter.

Figures 10, 13, 22, 23:
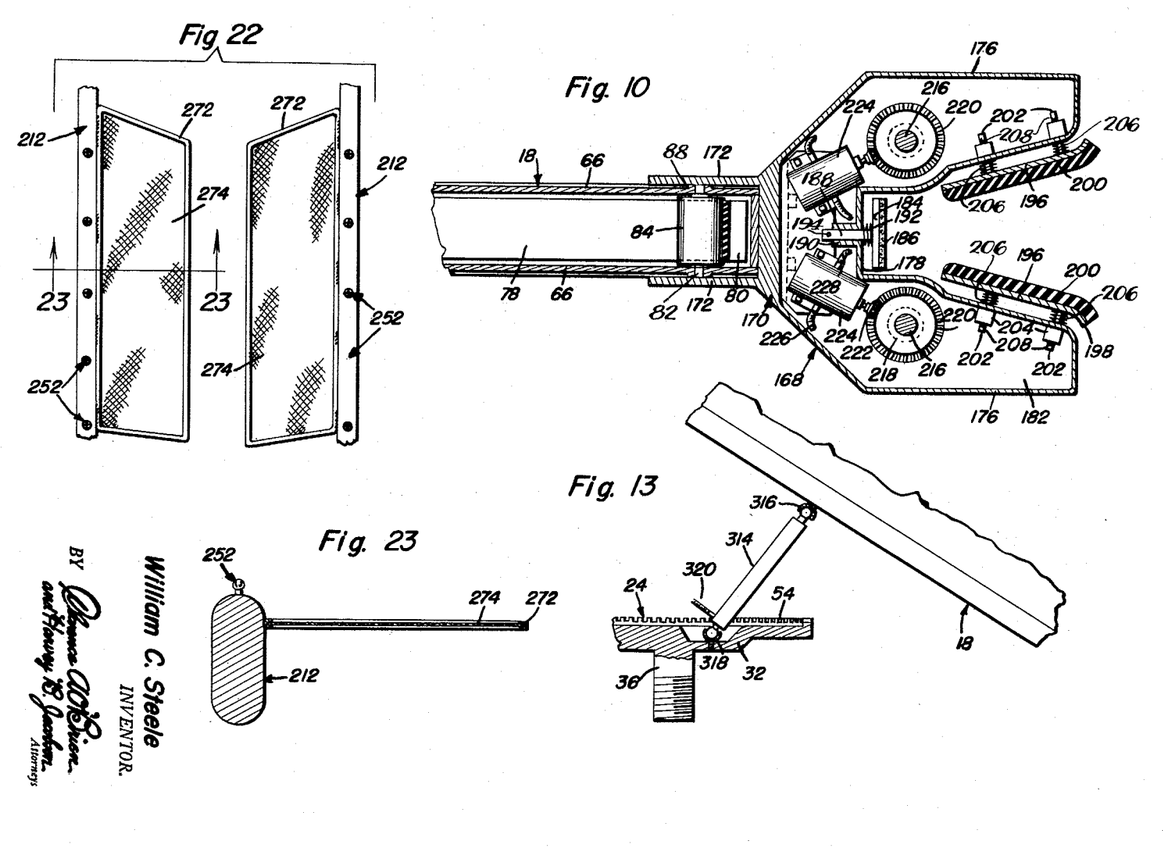
Figure 10 is an enlarged horizontal sectional view taken substantially upon the plane indicated by the section line 10—10 of Figure 1 and shows the construction of the outer end of the conveyor including means for rotating the hopper into a fruit and nut receiving position surrounding a tree.
Figure 13 is an enlarged fragmentary side elevational view of the inner portion of the conveyor and its relationship with the turntable, portions of the turntable being broken away and shown in section in order to clearly illustrate the manner in which a hydraulic cylinder for pivoting the conveyor in a vertical plane is attached thereto.
Figure 22 is an enlarged fragmentary top plan view of a pair of the support arms of the hopper which are adapted to cross each other at the central outer portion of the hopper and shows the construction of abutting panels which are adapted to receivingly engage each other for closing a central opening in the hopper adjacent a tree disposed therein.
Figure 23 is an enlarged fragmentary sectional view taken substantially upon the plane indicated by the section line 23—23 of Figure 22 and shows the construction of one of the spring mounted panels.

Referring now to Figures 7, 9 and 10 in particular, it will be seen that there is secured to the outer end of the conveyor 18 and supported thereby a horizontal bifurcated head which is referred to in general by the reference numeral 168. The head 168 includes a generally channel-shaped member 170 which extends vertically and which has a pair of spaced parallel legs 172. The legs 172 are disposed on opposite sides of the outer end of the conveyor 18 and rigidly secured to the same by suitable fasteners 174, the fasteners 174 being connected to the side plates 66 of the conveyor. Extending outwardly from the channel-shaped member 170 are identical generally U-shaped plates 176, one leg of each plate 176 being connected to the channel member 170 and the other leg being connected to a transverse plate 178 which extends in spaced parallel relation to the channel member 170. The head 168 has upper and lower bifurcated plates 180 and 182, respectively, which overlie the edges of the plates 176 and 178 and are secured thereto.

It is intended that the bifurcated head 168 have disposed between the legs thereof a trunk of a tree whose crop is intended to be harvested. Inasmuch as the head 168 will be positioned by moving the vehicle 10 towards the trunk of the tree, it is seen that a slight amount of shock may result in the course of the engagement of the head 168 about the trunk of a tree. Therefore, there is disposed between adjacent legs of the plates 176 a plate 184 which has secured to the outer surface thereof a resilient pad 186. The plate 184 has secured to the other face thereof a shaft 188 which passes through the plate 178 and is journaled in a boss 190 carried thereby. The shaft 188 is urged outwardly by a spring 192 mounted thereon between the plates 178 and 184. Outward movement of the shaft 188 is limited by a transverse pin 194.

Secured to an adjacent leg of each of the plates 176 is an elongated plate 196 which has an outwardly bent outer end portion 198. Secured to the outer face of the plate 196 is a resilient pad 200. Extending normal to the portion of the plate 176 which the plate 196 is adjacent are a pair of shafts 202 carried by the inner faces of the plate 196. The shafts 202 pass through an adjacent portion of an associated plate 176 and are journaled in bosses 204 secured to the inner faces thereof. The shafts 202 have mounted thereon springs 206 which are disposed between the plates 176 and 196. Outward movement of the shafts 202 is limited by stop pins 208 carried by the shafts and engaging the inner ends of the bosses 204.

In view of the foregoing, it is seen that when the head 168 is positioned about a trunk of a tree, such as the tree 210 illustrated in Figure 2, any jarring action between the head 168 and the tree 210 will have the shock absorbed by either the plates 196 or the plate 184. Furthermore, should any shock be transmitted to the conveyor 18, the same will be transmitted to and taken up by the springs 128 which form parts of the mounting for the inner end of the conveyor, as described above.

It will be understood that the hopper 20 is supported primarily by the head 168 and includes a plurality of radiating support arms, which are referred to in general by the reference numeral 212 and which have extending therebetween panels of flexible material which are referred to in general by the reference numeral 214. The outline of one of the support arms 212 being best illustrated in Figure 20 and the outline of one of the panels 214 being best illustrated in Figure 24.

In order that the support arms may be pivoted from a radiating position to an overlying position on opposite sides of the conveyor 18, the same are mounted in sets and supported by vertical standards 216, each vertical standard extending upwardly from one leg of the bifurcated head 168. Each of the standards 216 is rotatably supported in bosses 218 extending upwardly from the plates 180 and 182. The lower end of the standard 216 is disposed within the head 168 and has mounted thereon for rotation therewith a ring gear 220. The ring gear 220 is meshed with a drive gear 222 carried by a drive shaft of a fluid motor 224. The fluid motor 224 is rigidly supported by the lower plate 182 and is provided with fluid lines 226 and 228 for supplying fluid thereto to selectively rotate the fluid motor in the desired direction.

Figure 19:
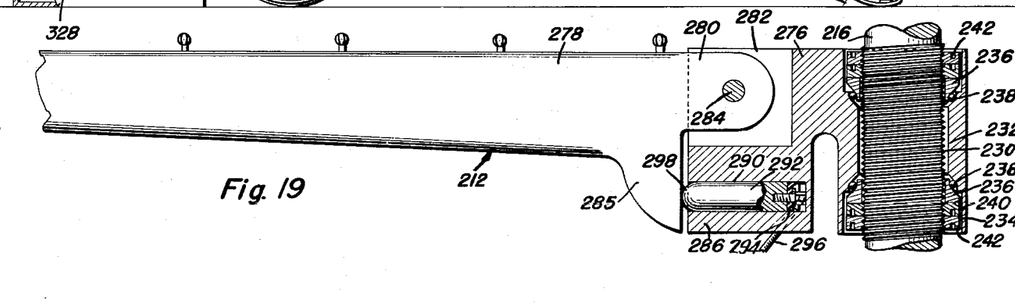
Figure 19 is an enlarged fragmentary side elevational view of an inner end of one of the support arms of the hopper, a portion of the support arm of the hopper being broken away and shown in section in order to clearly illustrate the manner in which the same is rotatably mounted on a vertical support and the means for selectively tilting the same to an upwardly directed position.

Referring now to Figures 7 and 19 in particular, it is seen that each of the standards 216 is provided with a plurality of vertically spaced enlarged externally threaded portions 230. Carried by each of the externally threaded portions 230 is an inner end of one of the support arms 212. It will be noted that the inner end of each of the support arms 212 is provided with a vertically extending bore 232 in which the enlarged portion 230 is disposed. Slidably retained on the enlarged portion 230 and disposed in upper and lower counterbores 234 of the bore 232 are cones 236. Disposed between the cones 236 and the inner faces of the counterbores 234 at the inner ends thereof are bearings 238. The cones 236 are moved into adjusted positions by nuts 240 threadedly engaged on the enlarged externally threaded portions 230 and are locked in adjusted positions by locknuts 242 also threaded on the externally threaded enlarged portion 230.

It is intended that the fit between the inner ends of the support arms 212 and the associated enlarged portions 230 of the standards 216 be such that when the standards are rotated, the support arms 212 will have a tendency to also rotate. However, the fit is also intended to be such that when the rotation of the support arms 212 is restrained, the standard 216 will rotate independently of its associated support arms.

The hopper, in addition to the support arms 212, also includes a fixed support arm 246. The fixed support arm 246 is identical with outer portions of the support arm 212 and is supported in a manner to be described in more detail hereinafter above the conveyor 18 and in alignment therewith, as is best illustrated in Figures 3 and 7.

Figure 3:
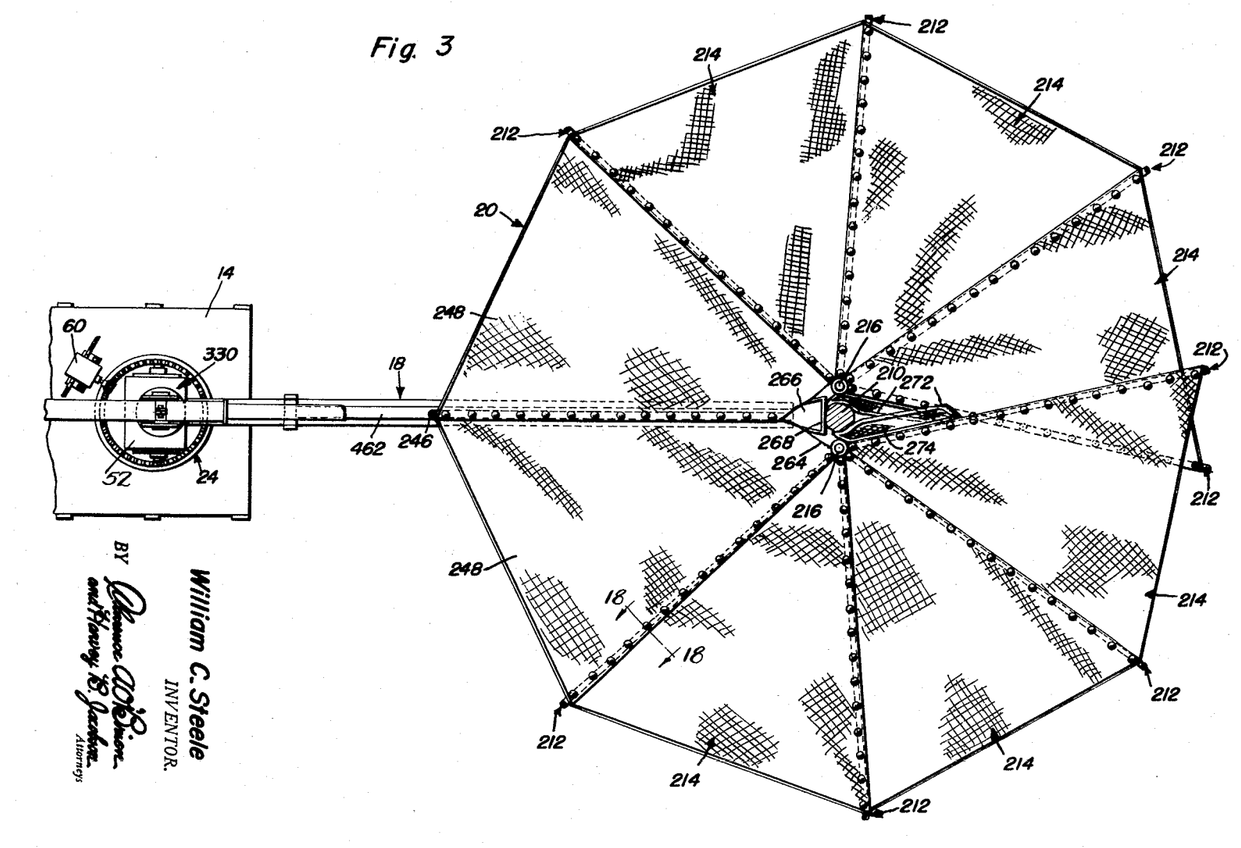
Figure 3 is an enlarged fragmentary top plan view of the fruit and nut harvester showing the same with the hopper surrounding a fruit or nut tree, the tree trunk being shown in section and parts of the fruit and nut harvester being broken away in order to clearly illustrate other portions thereof.

Referring now to Figure 3 in particular, it is seen that extending between and secured to the fixed support arm 246 and adjacent movable support arms 212 are generally triangular panels of flexible material, such as canvas, the panels being referred to in general by the reference numeral 248. Extending between adjacent movable support arms 212 are triangular panels 214 which are formed of the same material as the panels 248.

Figures 1, 18:
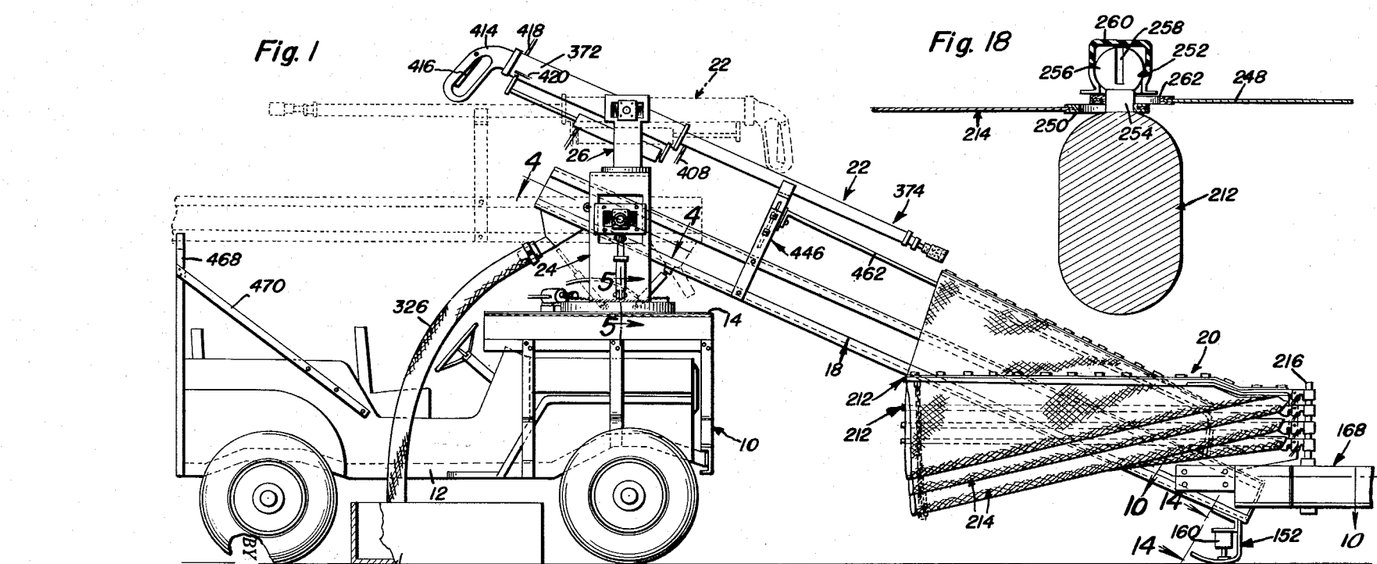
Figure 1 is a side elevational view with parts broken away and in section of the fruit and nut harvester, which is the subject of this invention, and shows the same in a collapsed state prior to association with a fruit or a nut tree, portions of the fruit and nut harvester being shown in a travelling position by dotted lines.
Figure 18 is an enlarged fragmentary sectional view taken substantially upon the plane indicated by the section line 18—18 of Figure 3 and shows the specific manner in which flexible sections of the hopper are removably attached to support arms thereof.

Referring now to Figure 24 in particular, it is seen that the triangular panel 214 is provided along two adjacent edges with a plurality of eyelets 250. These eyelets 250, as is best illustrated in Figure 18, are received over upstanding fasteners 252 carried at spaced intervals by the upper sides of the support arms 212 and 246. The fasteners 252 each includes a shank 254 which is rigidly secured in an associated support arm and a generally spherical head 256. The spherical head is provided with a vertical slot 258 extending substantially the entire distance therethrough. The eyelets 250 are of a size to easily fit over the heads by compressing the same due to the resiliency of the same. In order that the fasteners 252 will not bruise fruits or nuts dropping onto the hopper 20, the heads 256 thereof are provided with caps 260 which are resiliently mounted thereon. The caps 260 are formed of a relatively soft material, such as rubber, and prevent the impaling of fruit on the heads 256. It will be also noted that the panel 248 is provided with a plurality of eyelets 262, which are identical to the eyelets 260. The eyelets 262 are also disposed along edges of the panels 248 and are received over the heads of the fasteners 252 for securing the panels to their respective support arms.

Referring once again to Figure 3 in particular, it is seen that when the hopper 20 is in an expanded state, the uppermost support arms 212 of each set are in overlapped relation. However, since the vertical standards 216 are transversely spaced and the panels 248 are provided with offset inner ends, there is provided a relatively large central opening 264 in the hopper 20. It is intended that the trunk of the tree 210 be passed through this enlarged central opening 264 when the hopper 20 is disposed around the same. It will be understood that a portion of the opening 264 is disposed on the conveyor side of the trunk of the tree 210 and another portion of the opening 264 is disposed on the opposite side of the trunk. The portion of the opening 264 on the conveyor side of the trunk of the tree 210 is in alignment with an elongated chute 266 carried by the conveyor 18.

As is best illustrated in Figure 7, the elongated chute 266 has an outer portion 268 which extends vertically and is adapted to engage the tree 210. The remainder of the chute 266 is intended to completely underlie the portion of the central opening 264 adjacent the same and receive fruit and nuts dropping onto the hopper 20 from the tree 210. It will be noted that the chute 266 is carried by the upper plate 68 of the conveyor 18 and communicates with the interior of the conveyor and the conveyor belt 78 disposed therein through an opening 270 in the upper plate 68 at its point of juncture with the chute 266.

Referring now to Figures 22 and 23, it will be seen that there is illustrated inner portions of the two uppermost support arms 212. Secured to opposed sides of the support arms 212 are generally rectangular frames 272 which are closed by flexible panels 274, the panels 274 being formed of a flexible material such as canvas. The frames 272 are formed of an extremely resilient material, such as spring steel, and are adapted to be bent into any desired shape.

Referring once again to Figure 3 in particular, it is seen that the frames 272 and their associated panels 274 are disposed in the other portion of the central opening 264. The frames and panels overlap each other when the uppermost support arms 212 of the hopper 20 overlap each other and the frames 272 tightly engage the trunk of the tree 210. Due to the resiliency of the frames 272, they conform to the general configuration of the trunk of the tree and close the remainder of the central opening 264 to prevent escape of fruit or nuts being dropped onto the hopper 20. Due to the provision of the frames 272 and their panels 274, it is seen that various size tree trunks may be received within the central opening 264 without the loss of fruit or nuts dropping upon the hopper 20.

As is clearly illustrated in Figure 1 of the drawings, when the elements of the hopper 20 are disposed in a collapsed state, the support arms 212 extend rearwardly from their associated standard 216 in overlying relation. It will be also noted that the support arms 212 are disposed in horizontal planes. However, when the hopper 20 is in its extended state, the support arms 212 have not only been rotated to radial positions, but have also been tilted upwardly and outwardly. In order that the support arms 212 may be selectively tilted upwardly and outwardly, there is provided tilting means for the same, as is best illustrated in Figure 19.

It will be noted that each support arm 212 includes an inner portion 276, that portion which is secured to the vertical standard 216, and an outer portion 278, that portion to which the panels 214 and 248 are secured. Each of the outer portions 278 is provided at its inner end with an ear 280 which extends inwardly beyond the remainder of the outer portion 278 adjacent the upper side thereof. The ear 280 fits in an enlarged recess 282 in the inner portion 276 and is pivotally retained therein by a transverse pivot pin 284. It will be therefore seen that the outer portion 278 may be pivoted in a vertical plane with respect to the inner portion 276.

In order that the outer portion 278 may be selectively pivoted, it is provided with a downwardly extending shoulder 285 adjacent the inner end thereof. The inner portion 276 also includes a downwardly projecting shoulder 286 which is aligned with the shoulder 285. The shoulder 286 is provided with a longitudinal bore 290 which is normal to the face of the shoulder 285 and which opens through that side of the shoulder 286 adjacent the shoulder 285. Disposed within the bore 290 which is actually a cylinder, is an elongated piston 292 having packing means 294 at the inner end thereof. Communicating with the inner end of the bore 290 is a fluid line 296 which is adapted to supply fluid under pressure into the inner end of the bore 290 for forcing the piston 292 out of the same. It will be noted that the piston 292 is provided with a semi-spherical outer end 298 which is in constant engagement with an inner face of the shoulder 285. As the piston 292 is urged outwardly, the same engages the shoulder 285 and causes pivoting of the outer portion 278 upwardly about the pivot pin 284. When the pressure within the bore 290 is released, the weight of the outer portion 278 is sufficient to return the same to its horizontal position.

Referring now to Figures 20 and 21, it is seen that the outer end of each of the support arms 212 is provided with a longitudinally extending bore 300. Communicating with the bore 300 and extending normal thereto through a boss 302 is a lockscrew 304. It is intended that there be received within each bore 300 an inner end of an elongated extension 306. The extension 306, like the support arm 212, has projecting upwardly from the upper side thereof a plurality of fasteners 308, which are identical to the fasteners 252, to facilitate the fastening of an extension panel thereto.

Referring to Figure 25 in particular, it is seen that there is illustrated a generally trapezoidal outlined panel 310 which has opposite side edges thereof provided with a plurality of eyelets 312, the eyelets 312 being substantially identical with the eyelets 250 and 262. It is intended that the eyelets 312 be secured over the fasteners 308 for retaining the panels 310 between the extensions 306.

While the size of the hopper illustrated in Figure 3 is normally sufficient to receive fruits of all trees in a grove, there are some cases where an extremely large tree would have limbs extending outwardly beyond the confines of the hopper. Therefore, it is extremely desirable to provide an extension which may be secured to the hopper 20 to increase the area of the same. This extension is formed by the extensions 306 and the panels 310.

Referring now to Figures 2 and 13 in particular, it is seen that extending from the underside of the conveyor 18 down to the base 32 of the turntable 24 is an extensible hydraulic cylinder 314. The extensible hydraulic cylinder 314 is connected at its upper end by a universal joint 316 to the underside of the conveyor 18 and at its lower end by a universal joint 318 to the base 32. It will be seen that by extending the hydraulic cylinder 314 through the application of fluid into the same through a fluid supply line 320, the conveyor 18 may be tilted upwardly in a vertical plane from that position illustrated in Figure 2. When the pressure within the hydraulic cylinder 314 is released, the conveyor 18 will return to its normal position due to its own weight.

In view of the foregoing, it is seen that the fruit and nut harvester, which is the subject of this invention, may be readily positioned by elevating the conveyor 18 and its associated hopper 20 so as to be out of engagement with the ground through use of the hydraulic cylinder 314. Then the vehicle 10 is maneuvered so that a trunk of a tree, such as the tree 210, is received in the bifurcated head 168. After the trunk of the tree is received in the bifurcated head 168, the conveyor 18 is then lowered until its ground engaging support 152 is in engagement with the ground and supporting the other end of the same.

After the conveyor 18 has been properly positioned with respect to the trunk of a tree, the vertical standards 216 are rotated through the actuation of the fluid motors 224. This results in the hopper 20 surrounding the trunk of the tree. It will be understood that the support arms of the hopper 20 remain in their horizontal positions until after the hopper has surrounded the trunk of the tree. Then, by actuating the pistons 292, the support arms are tilted upwardly and outwardly to the positions illustrated in Figure 2.

After the hopper 20 is in position, it is seen that the same is ready to catch any fruit or nuts which may drop from the associated tree 210 whose trunk it surrounds. Fruit and nuts falling onto the surface of the hopper 20 will move towards its central opening 264 due to its inverted conical shape and pass into the chute 266. The fruit and nuts, after passing into the chute 266, then pass onto the conveyor belt 78 and are moved upwardly and inwardly by the same. As is best illustrated in Figures 1 and 7 in particular, there is secured to the underside of the inner end of the conveyor 18 a discharge spout 322. The discharge spout 322 is rigidly secured to the lower plate 70 of the conveyor 18 and communicates with the interior thereof through an opening 324 in the lower plate. Secured on the outer end of the discharge spout 322 is a flexible chute 326 which may be associated with a fruit or nut receptacle 328 disposed upon the ground.

It will be understood that when the fruit or nuts are harvested, the tree on which they are growing is vigorously shaken to cause the same to drop therefrom onto the hopper 20. In some cases, the rate of fall of the fruit or nuts will be such that there will be a tendency to clog the chute 266. When this happens, the vibrator unit 160 carried by the ground engaging support 152 is actuated to vibrate the hopper 20 and cause the fruit or nuts to gradually flow into the chute 266.

Referring now to Figures 2 and 6 in particular, it will be seen that resting upon the top of the plate 52 joined together with the vertical plates 50 which support the conveyor 18 is a second turntable which is referred to in general by the reference numeral 330. The second turntable 330 includes a seat 332 which is secured to the plate 52 by suitable fasteners 334. The seat 332 is provided with a centrally located circular recess in which is rotatably seated a base 336. The base 336 is supported within the recess in the seat 332 by suitable bearings 338. It will be also noted that the base 336 is provided with a centrally located depending shaft 340 which passes through both the seat 332 and the plate 52 and has mounted thereon a thrust bearing 342 underlying the plate 52. Engaging the underside of the thrust bearing 342 is a collar 344 which is retained in position by an adjusting nut 346 and a locknut 348 threadedly engaged on the lower end of the shaft 340 which is externally threaded.

Extending upwardly from the base 336 for rotation therewith is a pair of spaced parallel plates 350. The plates 350 are provided with inwardly directed lower flanges 352 which are secured to the base 336 by suitable fasteners 354.

The plates 350 are provided with aligned longitudinally extending slots 356 in which are guidingly mounted for sliding movement housings 358. Each of the housings 358 is formed in two pieces and includes a housing member 360 and a removable plate 362, the plate 362 being secured to the housing member 360 by suitable fasteners 364. It will be seen that portions of the housing member 360 and the plate 362 extend vertically above and below the upper and lower edges of the slot 356 with which they are associated to prevent the removal of the housing 358 therefrom.

The housings 358 are provided with aligned bores 366 in which are disposed trunnions 368 of a collar 370 in which is mounted an outer section 372 of an extensible pole which is referred to in general by the reference numeral 374.

Referring now to Figure 2 in particular, it will be seen that the housings 358 are located centrally of the slots 356 and that disposed on opposite sides of the same are coil springs 376. The coil springs 376 form shock absorbing mounting means for the collar 370 and its associated extensible pole 374.

Figure 17:
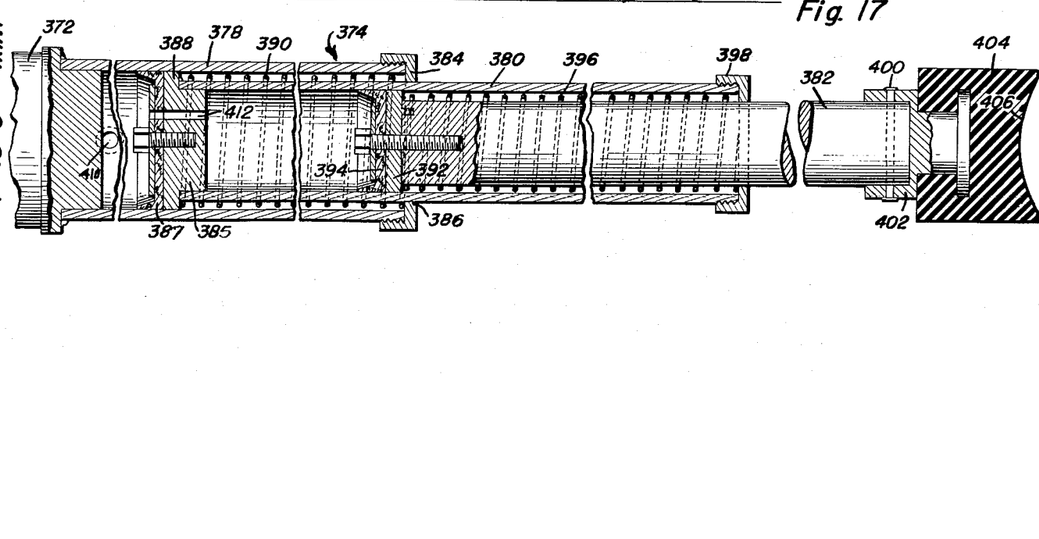
Figure 17 is an enlarged longitudinal sectional view taken substantially upon the plane indicated by the section line 17—17 of Figure 2 and shows the general construction of the telescoping pole portion of the tree shaking device, central portions of the pole being omitted.

Referring now to Figure 17 in particular, it is seen that the extensible pole 374 includes a plurality of tubular sections secured to the forward end of the outer section 372, the forward end of the outer section 372 being closed. The tubular sections, which include an outer tubular section 378, a next inner tubular section 380, and an inner, preferably solid section 382.

The outer tubular section 378 has one of its ends rigidly secured to the section 372 and its other end provided with a removable cap 384 threadedly engaged thereon. The cap 384 is provided with a centrally located bore 386 therethrough through which extends the tubular section 380.

Disposed within the tubular section 378 is a portion of the tubular section 380. Secured to the end of the tubular section 380 disposed within the tubular section 378 is a plug 385 to which is secured a sealing or packing element 387. The sealing or packing element 387 threadedly engages the inner walls of the tubular section 378 and forms a fluid-tight seal therewith. The plug 385 is also provided with a shoulder portion 388 against which engages one end of a coil spring 390 which surrounds that portion of the tubular section 380 and which abuts against the cap 384. The coil spring 390 urges the tubular section 380 into telescoped relation with respect to the tubular section 278.

The inner section 382 has secured to that end thereof which is disposed within the tubular section 380 an annular disk 392 having a circumference substantially equal to that of the inner wall of the tubular section 380. Secured to the disk 392 is a packing element 394 substantially identical to the packing element 387, the packing element 394 engaging the inner surface of the tubular section 380 in fluid-tight relation. Surrounding that portion of the section 382 disposed within the tubular section 380 and abutting against an outwardly extending portion of the disk 392 is a coil spring 396. The other end of the coil spring 396 abuts against a cap 398 carried by the other end of the tubular section 380 and through which the tubular section 382 passes.

Secured to the other end of the section 382 for pivotal movement by a pivot pin 400 is a fitting 402. Secured to the fitting 402 is a resilient head 404 which is provided with a seat 406 in the outer face thereof. The seat is so configurated to engage a limb of the tree 210 without slipping therefrom when pressure is exerted thereon.

Connected to the tubular section 378 adjacent the section 372 is a fluid supply line 408. The fluid supply line 408 communicates with the interior of the tubular section 378 through a bore 410 therein in order that fluid under pressure may be supplied to the interior of the tubular section 378 to force the tubular section 380 therefrom into an extended position. In order that the section 382 may also be forced out of the tubular section 380, there is provided a bore through the plug 384 and the packing element 386 through which fluid may flow into the interior of the tubular section 380, the bore being referred to by the reference numeral 412. After the pressure on the fluid disposed within the tubular sections 378 and 380 has been released, the springs 390 and 396 will return the sections 380 and 382 to their telescoped positions.

Referring now to Figure 1 in particular, it is seen that secured to the other end of the section 372 is a handle 414. The handle 414 is intended to be utilized in both rotating the extensible pole 374 about a vertical axis and also pivoting the same about a horizontal axis. The handle 414 also includes a trigger 416 which is operatively connected to a valve of a vibrator unit disposed within the section 372. It will be understood that the valve and vibrator unit are of conventional construction and are therefore not illustrated. Passing into the section 372 are fluid supply lines 418 and 420 for supplying fluid under pressure to the vibrator unit disposed therein.

Referring now to Figure 15 in particular, it is seen that there is illustrated a counterbalance assembly for the tree shaking device 22 of which the extensible pole 374 forms a major part. The counterbalance assembly is referred to in general by the reference numeral 422 and includes an elongated shaft 424 which is in spaced parallel relation with respect to the section 372 and is retained beneath the same by a pair of hangers 426 carried by the section 372. Mounted on the shaft 424 for sliding movement thereon is a heavy weight 428 which has a bore 430 therethrough. Mounted on the shaft 424 is a fixed piston 434 which is in sealed engagement with the bore 430. Extending between a forward or outer end of the bore 430, which is closed by a plate 432, and the piston 434 is a coil spring 436, the coil spring 436 being disposed around the shaft 424. The coil spring 436 urges the weight 428 to the right, as viewed in Figure 15. Connected to the weight 428 at the left end thereof is a fluid supply line 438 which communicates with the bore 430 at the left of the piston 434. When fluid pressure is applied to the interior of the bore 430, the weight 428 is moved to the left, as viewed in Figure 15, due to the influence of the fluid pressure upon the piston 434 and the sealed left hand end 440 of the bore 430.

Referring now to Figure 16 in particular, it will be seen that the piston is in the form of an annular member received on the shaft 424 and secured thereto by a pin 440. The annular member is provided with an annular groove 442 in its outer periphery in which is disposed an annular sealing ring 444, the sealing ring engaging the wall of the bore 430 in sealing relation.

Referring now to Figures 7 and 8 in particular, it is seen that carried by the conveyor 18 intermediate the ends thereof is a tree shaking device support 446. The tree shaking device support 446 includes a pair of spaced parallel upwardly projecting bars 448 which have disposed therebetween and secured thereto in adjusted relation a channel member 450. The channel member 450 is provided with a pair of aligned vertical slots 452 in its legs in which are received transverse fasteners 454 carried by the bars 448. The fasteners 454 are provided with sleeves 456 extending between the legs of the channel 450 in order to prevent the collapsing of the same. It will be seen that by loosening the fasteners 454, the channel 450 may be vertically adjusted with respect to the bars 448. Secured to the upper ends of the legs of the channel 450 is an upwardly open, open channel 458 which is adapted to receive a portion of the extensible pole 374, which is a major part of the tree shaking device 22.

Also secured to the bars 448, as is best illustrated in Figure 11, is a plate 460, the plate 460 being substantially vertically disposed. Extending outwardly from the plate 460 is an elongated bar 462 having a downwardly turned inner end 464 secured to the plate 460. The bar 462 also includes a downwardly turned flange 466 at its outer end which is secured to both the upper plate 68 of the conveyor 18 and the inner wall of the chute 266. The bar 462 underlies and supports the support arm 246.

Referring once again to Figure 1 in particular, it is seen that secured to the rear of the body 12 of the vehicle 10 is a support 468 which extends vertically and which is braced by a diagonal brace 470. The support 468 is intended to support the conveyor 18 in a horizontal position overlying the vehicle 10 when it is utilized for travelling between distant points.

Referring now to Figure 26 in particular, it is seen that there is illustrated a valve assembly which is referred to in general by the reference numeral 492. The valve assembly 492 includes a longitudinal bore 474 through a block 476, the bore 474 having threadedly engaged in opposite ends thereof one end of the fluid supply line 408 and one end of a fluid supply line 478. Also formed in the block 476 and communicating with the bore 474 is an L-shaped fluid passage 480. Aligned with one leg of the L-shaped fluid passage 480 is an internally threaded bore 482 in which is disposed a needle valve assembly 484. The needle valve assembly 484 controls the flow of fluid through the L-shaped fluid passage 480 and thereby controls the flow of fluid through the fluid supply line 438 which is secured in the block 476 in communication with the L-shaped passage 480. It will be seen that by adjusting the needle valve 484, the flow of fluid to the counterbalance assembly 422 may be varied so that the weight 428 is moved simultaneously with the extension of the extensible pole 374 at the same rate to maintain the tree shaking device 22 in balanced condition at all times.

After the hopper 20 has been properly positioned with respect to a tree, such as the tree 210, the tree shaking device 22 has the outer end of its extensible pole 374 selectively engaged with main limbs of the tree. Then the trigger 416 of the handle 414 is tripped so as to vibrate the tree shaking device 22. The vibrating of the tree shaking device results in the shaking of the limb with which it is engaged so as to shake both the limb and adjoining portions of the tree and cause either fruit or nuts to drop therefrom onto the hopper 20.

Figure 27:
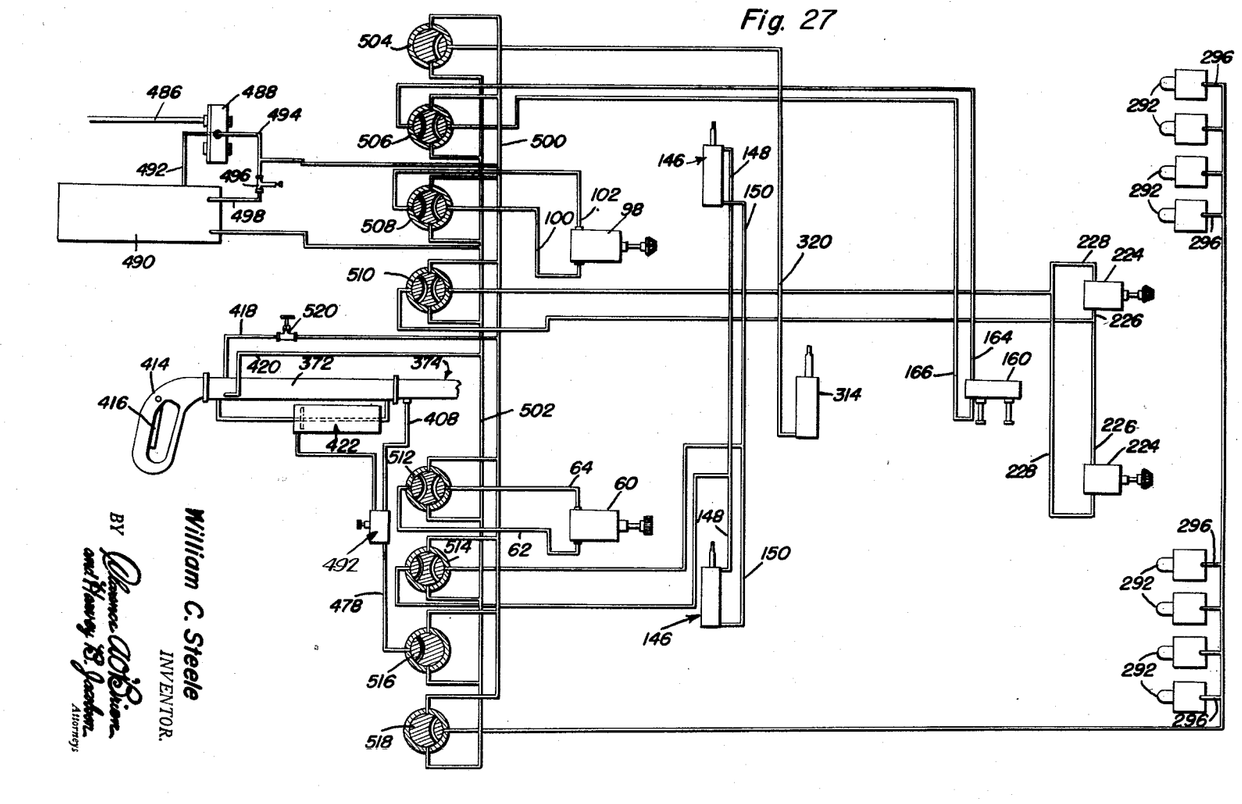
Figure 27 is a schematic diagram of the fluid control system for the fruit and nut harvester.

Referring now to Figure 27 in particular, it is seen that there is illustrated a control diagram for the various portions of the fruit and nut harvester, which is the subject of this invention. It will be understood that mounted on a suitable drive shaft 486, which may be connected either to a power take-off of the vehicle 10 or to a separate power unit, is a fluid pump 488. The fluid pump 488 is connected to a fluid reservoir 490 by a fluid supply pipe 492. The discharge opening of the fluid pump 488 has connected thereto a main fluid supply line 494. Connected in the fluid supply line 494 is a pressure release valve 496 which is communicated with the reservoir 490 by a return line 498 to ensure a maximum pressure supply to the various elements of the fruit and nut harvester.

Communicating with the main fluid supply line 494 is a master fluid supply line 500. The master fluid supply line 500 is intended to run behind a panel board having a plurality of valves mounted thereon for controlling the operation of the prune and nut harvester, the panel board not being shown. A similar fluid return line 502 is also provided, the fluid return line 502 being connected to the fluid reservoir 490. It will be understood that the master fluid supply line 500 and the fluid return line 502 will be connected to each of the valves described in detail hereinafter.

Provided is a first valve 504 which is connected to the fluid supply line 320. When the valve 504 is positioned in one direction, the fluid supply line 320 is communicated with the master fluid supply line 500 to extend the hydraulic cylinder 314 and tilt the conveyor 18 in a vertical plane. When the valve 504 is turned in another direction, the fluid supply line 320 is communicated with the return line 502 to exhaust the hydraulic cylinder 314 and allow the same to return into its normal position.

A second valve 506 is provided to connect the vibrator unit 160 to the fluid pump 488 and the fluid reservoir 490. It will be seen that when the valve 506 is properly positioned, the flow of fluid from the fluid pump into the vibrator unit and back into the reservoir is continuous.

Another valve 508 is provided for similarly connecting the fluid motor 98 of the conveyor to the fluid pump 488 and the fluid reservoir 490. Still another similar valve 510 is provided for communicating the fluid motors 224 which operate the vertical standards with the fluid pump and reservoir.

It will be noted that also provided are valves 512 and 514. The valves 512 and 514 are connected to the fluid motor 60 and the hydraulic cylinders 146, respectively. While the fluid motor 60 operates in the same manner as the fluid motors 98 and 224, the operation of the hydraulic cylinders 146 is entirely different. When the valve 514 is set in one direction, one hydraulic cylinder 146 is extended and the other is allowed to contract. When the valve 514 is turned in the opposite direction, the first hydraulic cylinder is allowed to contract while the other is expanded.

Provided for the control of the fruit and nut harvester is a simple valve 516. The valve 516 is connected to the fluid supply line 478 for supplying fluid to both the extensible pole 374 and the counterbalance assembly 422. The relationship of the valve 492 is also clearly illustrated.

Still another simple valve 518 is provided for connecting the bores 290 with which the pistons 292 reciprocate to the fluid pump 488 and the fluid reservoir 490. When the valve 518 is moved in one direction, the support arms 212 are elevated, and when the same is moved in the opposite direction, they are allowed to return to their normal positions.

It will be noted that the fluid supply lines 418 and 420 are connected to the master fluid supply line 500 and the return line 502, respectively. It will also be noted that the fluid supply line 418 is provided with a hand operated valve 520 for directing fluid pressure to the vibrator unit carried within the section 372.

From the foregoing, it will be readily apparent that the fruit and nut harvester, which is the subject of this invention, is highly mobile and may be utilized to harvest crops of trees which are planted on uneven ground and that due to the novel construction of the same, the device may be operated by a minimum number of men. It will be also readily apparent that the operation of the same is highly efficient whereby a maximum percentage of the fruit or nuts will be harvested. Also, the speed of harvesting is greatly increased so that no loss of fruit or nuts will be occasioned.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A fruit and nut gathering combination comprising a head member including a pair of oppositely disposed leg portions adapted to extend on opposite sides of a tree trunk from which fruit or nuts are to be gathered, a pair of vertically extending standards supported on said head member in spaced relation on each of said legs, a plurality of hopper forming radially extending support arms pivotally carried by said standards, flexible panel members connectible between adjacent support arms for forming a hopper about the trunk of a tree, said panels including portions defining an open bottom in said hopper, and an endless conveyor operatively connected to said head and extending below the open bottom of said hopper for receiving thereon and conveying crops gathered by said hopper.

2. In the combination as set forth in claim 1 wherein vibration creating means are operatively connected between said conveyor and hopper for urging the movement of fruit or nuts from said hopper onto said endless conveyor.

3. In the combination as set forth in claim 1 wherein one end portion of said conveyor supports said end member, and an opposite end portion of said conveyor is adjustably carried on a mobile platform.

4. In the combination as set forth in claim 3 wherein said mobile platform includes a tree shaking device adjustably supported thereon.

5. In the combination as set forth in claim 4 wherein said tree shaking device comprises an extensible pole having a tree contacting portion on one end, and including an opposite end portion pivotally carried on a vertical and horizontal pivotal axis on said mobile platform.

6. In the combination as set forth in claim 3 including means operatively connected between said mobile platform and conveyor for adjusting said conveyor both vertically and horizontally upon said mobile platform for compensating for variations in terrain.

7. In the combination as set forth in claim 6 wherein said head member includes cushioning means thereon for absorbing shock when coming into contact with the tree, said conveyor including shock absorbing means relatively connected between said mobile platform and conveyor for resiliently mounting the conveyor thereon.

8. In the combination as set forth in claim 1 including power operated means on said head member for urging said radial support arms into a hopper forming relationship.

9. In the combination as set forth in claim 8 wherein each of said radial support arms are carried on said vertical supports by an element pivotally mounted thereon, said element including a portion providing a horizontal pivot for said support arms, and means for selectively elevating said arms about said horizontal pivot for forming said hopper.

10. In the combination as set forth in claim 1 wherein each of said support arms includes on an outer end portion removably carrying extension elements for increasing the area covered by said hopper formed by the radial support arms.

11. In the combination as set forth in claim 1 including a mobile platform, a turntable mounted on said platform, a vertical support secured to said turntable and extending upwardly therefrom, said conveyor being pivotally secured adjacent one end portion thereof to said support, said hopper being carried by an opposite end portion of said conveyor, said vertical support comprising a pair of parallel members, each of said members having a rectangular opening therein, said openings being axially aligned, a frame member having a central rectangular opening mounted in each of the first named openings for vertical slidable movement therein, a housing mounted in each of said second named openings for horizontal sliding movement therein, a bearing universally mounted in each of said housings, and a shaft mounted on said conveyor, said shaft having opposite end portions thereof mounted in said bearings.

12. In the combination as set forth in claim 11 including a horizontal plate extending across a top portion of the pair of spaced parallel members, said horizontal plate having a central vertical bore therein, a pair of upwardly extending parallel plates secured to a base portion having a shaft portion rotatably mounted on said horizontal plate, said last mentioned parallel plates having rectangular openings therein, horizontally slidable bearing blocks mounted in said openings, said device having stub shafts extending from the opposite sides thereof and received in said bearings for supporting a tree shaking device therein.

13. In the combination as set forth in claim 12 wherein power means are operatively connected between said turntable and said mobile platform for rotating said conveyor relative to said mobile platform.

14. In the combination as set forth in claim 4 wherein said tree shaking device includes counterbalancing means thereon for balancing the tree shaking device about a horizontal pivot axis.

References Cited in the file of this patent

UNITED STATES PATENTS

| 478,903 | Ball | July 12, 1892 |
| 492,751 | Ross | Feb. 28, 1893 |
| 492,952 | Ball | Mar. 7, 1893 |
| 792,880 | Casey | June 20, 1905 |
| 1,472,262 | Abildgaard | Oct. 30, 1923 |
| 1,473,081 | Cook | Nov. 6, 1923 |
| 1,520,129 | Hedeen | Dec. 23, 1924 |
| 1,626,068 | Bartlett | Apr. 26, 1927 |
| 1,870,432 | Witter | Aug. 9, 1932 |
| 2,159,311 | Berger | May 23, 1939 |
| 2,175,541 | Probert | Oct. 10, 1939 |
| 2,230,139 | Gustin | Jan. 28, 1941 |
| 2,619,219 | Carroll et al. | Nov. 25, 1952 |
| 2,649,680 | Brown | Aug. 25, 1953 |
| 2,685,775 | Gould et al. | Aug. 10, 1954 |
| 2,690,639 | Goodwin | Oct. 5, 1954 |
| 2,692,470 | Boman | Oct. 26, 1954 |

FOREIGN PATENTS

| 617,027 | France | Nov. 8, 1926 |